Figures 1, 2:
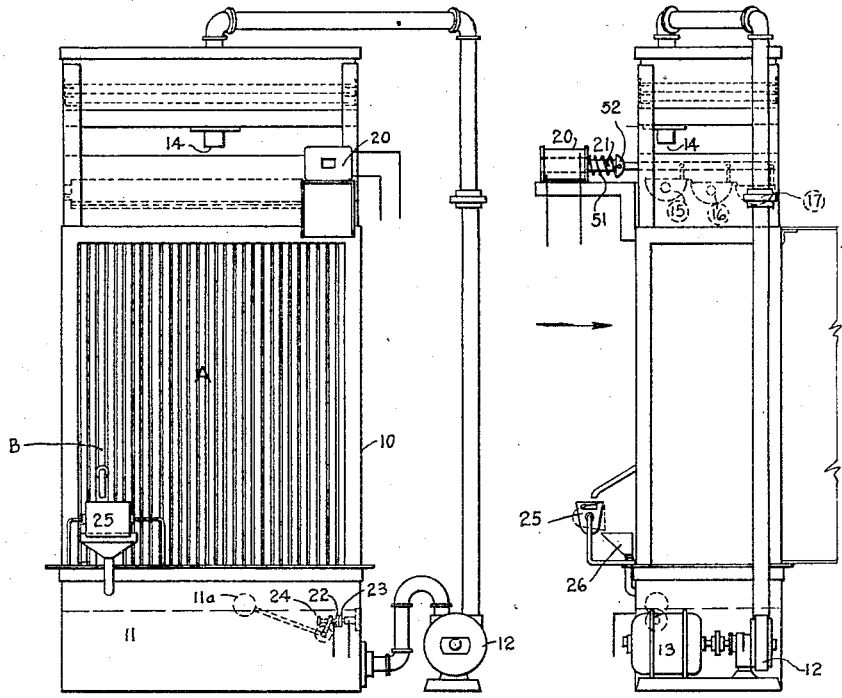

Aug. 2, 1932. C. P. HEGAN 1,870,196
AIR FILTER
Filed June 18, 1928 2 Sheets-Sheet 1

INVENTOR.
CHESTER P. HEGAN
BY John L. Milton
ATTORNEYS.

Aug. 2, 1932.          C. P. HEGAN          1,870,196
AIR FILTER
Filed June 18, 1928    2 Sheets-Sheet 2

*INVENTOR.*
CHESTER P. HEGAN
BY *John L. Milton*
*ATTORNEYS.*

Patented Aug. 2, 1932

1,870,196

UNITED STATES PATENT OFFICE

CHESTER P. HEGAN, OF LOUISVILLE, KENTUCKY, ASSIGNOR TO AMERICAN AIR FILTER COMPANY, INC., OF LOUISVILLE, KENTUCKY, A CORPORATION OF DELAWARE

AIR FILTER

Application filed June 18, 1928. Serial No. 286,291.

The present invention relates to an improvement in filters for air, gas and the like more particularly of the type wherein filtering media coated with a viscous material are exposed to a stream of air or the like to be cleaned and, while the air stream is interrupted, are flushed or drenched with a cleaning liquid. One object of the invention has been to provide filtering apparatus of the character indicated in which the cleaning operation may be rapidly accomplished and without removing filtering units from the frame or housing in which they are normally positioned in the usual filter installation. Another object of the invention has been to automatically control the number of consecutive cleaning operations to be effected at any given time and coordinate them with the operation of a fan or other device for producing the air stream.

In general, my invention comprises a filtering element or unit, means for causing a stream of air to pass therethrough, a liquid accumulating and dumping receptacle operatively positioned above the filtering unit, means for supplying liquid to said accumulating and dumping receptacle, and means for automatically controlling operation of the liquid supplying means and of the accumulating and dumping receptacles and coordinating their operation with that of the means for producing the air stream.

Figures 3, 4:
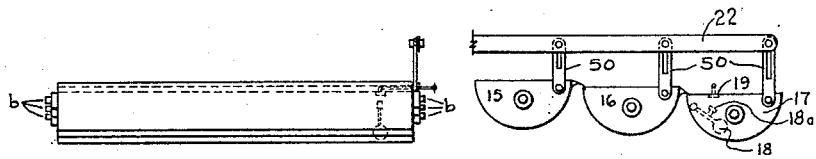
Figure 5:
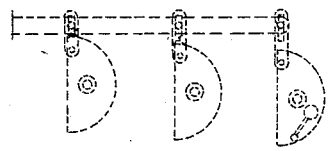
Figure 6:
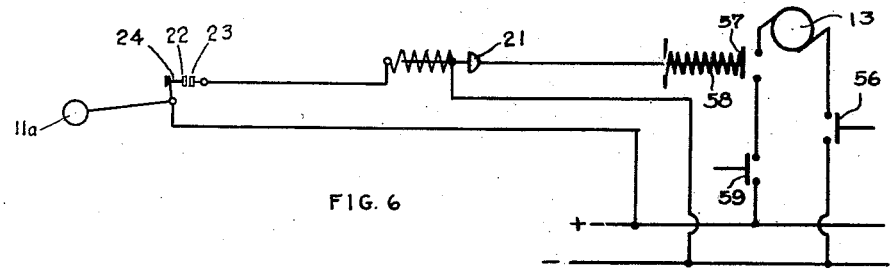
Figure 7:
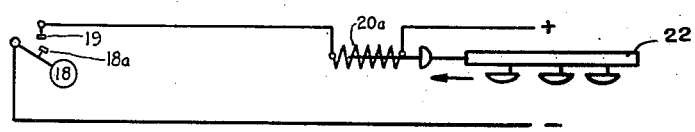
Figure 8:
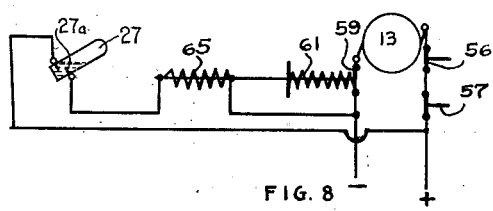
Figure 9:
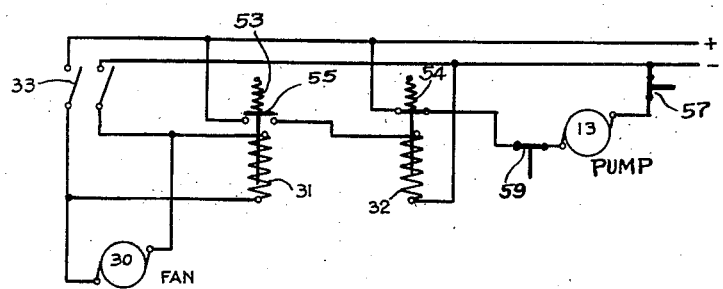

A preferred embodiment of my invention is illustrated in the drawings accompanying the present specification and in which:

Figure 1 is a front elevation;

Figure 2, a side elevation;

Figure 3, a detail view in front elevation of a plurality of interconnected accumulating and dumping receptacles or tanks;

Figure 4, a side elevation of the same in accumulating position;

Figure 5, a side elevation of the same in dumping position;

Figure 6, a wiring diagram showing the circuit controlled by level of the liquid in the supply tank in its relation to the pump motor circuit;

Figure 7, a wiring diagram showing the circuit controlled by the level of liquid in the dumping or accumulating tank;

Figure 8, a wiring diagram showing the circuit controlled by the level of liquid in the auxiliary tank in its relation to the pump motor circuit; and Figure 9, a wiring diagram showing the pump motor circuit in its relation to the fan motor circuit.

As indicated in Figure 1, a filtering unit A comprising a plurality of filtering media such as hollow tubes, is mounted in a housing 10 and in the path of an air stream induced by a fan or other suitable means not shown, the direction of the stream being indicated by the arrow in Figure 2. In normal operation of the filter, the filtering media, being coated with a suitable viscous liquid, accumulate quantities of dust, dirt and the like which will be removed from time to time when the fan is not operating.

Apparatus for cleaning the surfaces of the filtering media comprises a plurality of accumulating and dumping tanks 15, 16 and 17 supported above the filtering unit and in such position that when full of cleaning liquid, they may conveniently be dumped to flush or drench the filtering surfaces.

At the bottom of the housing and below the filtering unit, I provide a supply tank 11 from which the cleaning liquid is pumped by means of a pump 12 and discharged through an opening or nozzle 14 positioned just above tank 15. In operation, when tank 15 becomes filled, the excess flows into tank 16. When the latter becomes filled, the excess flows into tank 17. In the latter tank, I provide a float 18 carrying a contact 18a. A contact 19 is engaged by the contact 18a when the float 18 is raised sufficiently by the liquid in tank 17. Contacts 19 and 18a are positioned in the circuit illustrated in Figure 7, which also includes a solenoid 20 having a coil 20a. A plunger 21, mounted in operative relation to said coil, is adapted to be retracted toward the coil whenever the latter is energized by closing of the contacts 18a and 19. As shown in Figure 2, the plunger 21 is provided with an enlarged portion 52 forming in effect a flange between which and one end of the solenoid 20

I have provided a compression spring 51, the function of which is to tend normally to retain the plunger 21 and thereby the rod 22 in extended position, or in other words, in position so that the tanks 15, 16 and 17 will be in operative relation to the discharge outlet 14. In operation, when the circuit which includes the contacts 18a and 19 is closed, and the solenoid 20 is energized, the plunger 21 and the rod 22 are retracted against resistance of spring 51, thus dumping the accumulated liquid from tanks 15, 16 and 17. However, as soon as said circuit is broken, thus deenergizing the solenoid 20, spring 51 causes rod 22 to return to normal position.

The foregoing operations will be repeated a predetermined number of times in succession only during periods when the air stream is not passing through the filter in filtering relation. Where the air stream is induced by means of a motor driven fan and the pump by means of which liquid is supplied to the accumulating tanks is also actuated by a motor, the circuits are so connected that the pump motor circuit will be open or closed, depending on whether the fan motor circuit is closed or open. This arrangement is illustrated diagrammatically in Figure 9. The pump actuating motor 13 is connected across the main power lines, and in parallel with the fan actuating motor 30. A hand operated or other suitable switch 33 is interposed in the circuit of fan 30. A relay 31 shunted across the circuit of motor 30 and controlled by operation of switch 33, is operatively connected to a circuit breaker 55 arranged in circuit with a relay 32, the latter being operatively connected with a circuit breaker 56 in the circuit of motor 13. A spring 54 tends to retain breaker 56 in circuit closing position. A spring 53 tends normally to retain circuit breaker 55 in circuit opening position. With the parts occupying the relative positions indicated in Figure 9, the fan motor circuit is broken thereby deenergizing coil 31 and permitting circuit breaker 55 to open the circuit of coil 32 by operation of spring 53. The circuit of coil 32 being open, permits the circuit breaker 56 to be drawn into position to close the circuit of motor 13, thus actuating pump 12.

The operation of motor 13 is further dependent on the amount of liquid in the tank 11, means being provided so that when the level of liquid therein falls below a certain predetermined point, the motor 13 will automatically stop until the level of liquid in the tank 11 shall again reach a predetermined height therein. As indicated diagrammatically in Figure 6, a float 11a controls the operation of a switch having a fixed contact 23 and a movable contact 22a. When the liquid in tank 11 reaches a certain predetermined low level, the float 11a will cause disengagement of the movable contact 22a from the fixed contact 23 to interrupt the circuit of motor 13. A link motion connection indicated at 24 operates to again connect contacts 22a and 23 after the addition of liquid to the tank 11 has caused the level to rise to a predetermined height. With contacts 22a and 23 in the disengaged position shown in Figure 6, a circuit breaker 57 in circuit with motor 13 will be in retracted or circuit opening position by operation of a spring 58. When contacts 22a and 23 are again engaged, the solenoid in circuit therewith causes its plunger to move the circuit breaker 57 against resistance of spring 58 into position to effectively close the circuit of motor 13.

From the foregoing, it is apparent that, if no provision were made to the contrary, pump 12 would continue to operate and the tanks 15, 16 and 17 would continue to periodically accumulate liquid and dump the same as long as the fan motor circuit remains open and the level of liquid in the tank 11 is sufficiently high to maintain the contacts 22a and 23 in operative engagement. However, it is contemplated that a relatively limited number of consecutive applications of the cleaning liquid will be sufficient for ordinary purposes to clean or recondition a filter unit, the number varying in accordance with varying operating conditions. Accordingly, I provide means whereby the dumping tanks may be controlled to operate a predetermined number of times in succession and thereafter to remain idle until or unless the control mechanism is reset by hand or otherwise to permit another sequence of dumping operations. For the purpose indicated, I provide an auxiliary control tank 25 which is balanced on a pivotal mounting located between its full and empty centers of gravity so that it will upset and dump its liquid content after it accumulates a predetermined amount of liquid and then return to its accumulating position. This tank is supplied by a hollow baffle B which, acting as a conduit, conveys a small portion of the liquid dumped from the tanks 15, 16 and 17 downwardly and into the auxiliary tank 25. The hollow tube B will be calibrated to deliver upon each dumping operation of the upper tanks a predetermined amount of the cleaning liquid. The upset capacity of the auxiliary tank 25 is fixed at that quantity of liquid which will cause the tank 25 to discharge into spout 26 after the upper tanks have discharged a predetermined number of times. The effect of the dumping of auxiliary tank 25 is transmitted to the pump motor circuit in any suitable manner, as by means of a circuit breaker cooperating with a relay arranged in the circuit of a mercury controlled switch, shown in Figure 8 as a mercury tube 27 mounted on the tank 25 in such a manner that when the tank is in upright position, the circuit contacts will be covered by the mercury and uncovered when the tank is in discharging position, thus breaking said circuit. In Figure 8, I show a circuit breaker 59 cooperating with a relay 60 arranged in the circuit of contact 27a. When said circuit is energized, the parts being in the position as shown in said figure 8, circuit breaker 59 closes the circuit of motor 13 against the resistance of a spring 61. When the relay 60 is deenergized, as when tank 25 is in discharging position, spring 61 withdraws the circuit breaker 59 to circuit opening position.

I claim:—

1. In a filter the combination of a filter unit, means for accumulating a supply of liquid at a level above said unit, means for automatically dumping said accumulated liquid toward said filter unit, means for supplying liquid to said accumulating means, and means actuated by the weight of a portion of the liquid dumped by the accumulating means for arresting operation of the liquid supplying means.

2. In a filter the combination of a housing, a filter unit therein, a supply tank below said unit, an upper accumulating and dumping tank above said unit, a pump for supplying liquid from said supply tank to said accumulating tank, means for periodically dumping the contents of said tank into flushing engagement with filtering surfaces of the filter unit, an auxiliary accumulating and dumping tank, a conduit for conveying a portion of the dumped liquid to said auxiliary tank, and means actuated by dumping operation of the auxiliary tank to arrest operation of said pump after a predetermined number of dumping operations of said upper tank.

3. In a filter system the combination of a filter unit, means for causing a stream of air to pass through said unit, a liquid accumulating and dumping tank positioned above said unit, a pump for supplying liquid to said tank, and means for arresting operation of said pump while said air stream is passing through the unit.

4. In a filter system the combination of a filter unit, a liquid accumulating and dumping tank positioned above the unit and normally positioned to receive a supply of liquid, means for supplying liquid to said tank, liquid level operated contact means cooperating with liquid therein, and a relay in circuit with said contact means and operatively connected to said tank to dump the same on the occurrence of a predetermined liquid level therein.

5. In a filter the combination of a filter unit, means for periodically dumping a cleaning fluid over said unit and automatic means for arresting the dumping operation after a limited number of dumping operations have occurred.

6. In a filter the combination of a filter unit, a tank, means for supplying a cleaning liquid to said tank, means for periodically dumping the contents of said tank over said unit, and automatic means for arresting the dumping operation after a limited number of dumping operations have occurred.

7. In a filter the combination of a filter unit, a tank, means for filling said tank with a cleaning liquid, means controlled by the filling of said tank for periodically dumping its contents over said unit, and automatic means for arresting the filling operation after a limited number of dumping operations.

8. In a filter system the combination of a filter unit through which a stream of air is adapted to pass and by which it is adapted to be cleaned, a liquid accumulating and dumping tank positioned above said unit, a pump for supplying liquid to said tank, and means for arresting operation of said pump while the said air stream is passing through the unit.

9. In a filter system the combination of a filter unit thru which a stream of air is adapted to pass and by which it is adapted to be cleaned, means for shutting off the air stream, a liquid accumulating tank and means for dumping the contents of said tank over the filter unit after the air stream is shut off.

10. In a filter system the combination of a filter unit, means for blowing air thru the unit, a liquid accumulating tank, means for dumping the contents of said tank over said unit, and means for preventing the concurrent operation of said blowing and dumping means.

11. In a filter system the combination of a filter unit, means for blowing air thru the unit, means for shutting off the air flow, means for subjecting the unit to the action of a liquid after the air flow has been shut off, means for arresting the operation of the liquid means after a suitable period of operation, and means controlled by the renewal of the air flow for reconditioning the liquid subjected means for subsequent operation.

In testimony whereof I affix my signature.

CHESTER P. HEGAN.